United States Patent Office 3,081,157
Patented Mar. 12, 1963

3,081,157
LIQUID COMPOSITION COMPRISING LIQUID
FREE OXYGEN AND METHOD OF REDUCING
THE SENSITIVITY OF SAME
William E. Gordon, Winchester, and Warren A. Salmon, Lexington, Mass., assignors to Arthur D. Little, Inc., a corporation of Massachusetts
No Drawing. Filed Sept. 19, 1958, Ser. No. 761,948
12 Claims. (Cl. 23—221)

This invention relates to a novel composition of matter and method of reducing the sensitivity of a liquefied normally gaseous material containing free oxygen. In some of its more specific embodiments, the present invention further relates to a novel desensitized mixture including a normally gaseous material containing free oxygen and an oxidizable organic substance, and to a method of handling such a mixture wherein the explosion hazard is reduced. The invention further relates to a novel method of reducing the explosion hazard when evaporating liquid oxygen to produce gaseous oxygen.

Commercial liquid oxygen, liquid air and other liquefied normally gaseous materials containing free oxygen are often contaminated with oxidizable organic substances which form an explosive mixture with liquid oxygen. The more common contaminants are hydrocarbons such as methane, ethylene, acetylene and lubricating oil, and perhaps substances such as peroxides and ozonides. Of these contaminants, acetylene and lubricating oil are particularly troublesome in practice due, in part, to their very slight solubility in liquid oxygen and their property of forming extremely sensitive explosive mixtures with liquid oxygen when present in a very low concentration. All of the above contaminants have relatively high boiling points, when compared with the boiling point of oxygen, and thus tend to concentrate upon evaporation of a body of oxygen.

Some of the more common sources of the above mentioned contaminants in commercial liquid oxygen or liquid air are contaminating substances present in the air feed to the liquid oxygen or liquid air plant, lubricating oils and greases used for lubricating purposes in various pieces of equipment comprising the liquid oxygen or liquid air plant, and contact between the liquid oxygen or liquid air product and contaminating substances, including contaminants in the atmosphere, during handling of the liquid oxygen or liquid air product. Any one or more of these contaminant sources may result in contamination of a commercial liquid oxygen or liquid air product with oxidizable organic substances. However, when producing commercial liquid oxygen or liquid air, it is often possible to assure the presence of only trace or very small amounts of high boiling point contaminants in the initial product by various expedients, such as by supplying an air feed substantially free of contaminants, by reducing or eliminating contact between the air feed or product and hydrocarbon lubricants and greases used in equipment, and reducing or eliminating contact between the liquid oxygen or liquid air product and contaminants as much as possible during handling.

The normally low level of high boiling point contaminants in commercial liquid oxygen or liquid air may be harmless in the original concentration, but during subsequent handling the contaminants may become sufficiently concentrated so as to result in an explosive mixture. For example, liquid oxygen or liquid air are often produced at a centrally located plant and shipped in the liquid state to the site of use, stored for a considerable period of time awaiting use, transferred from vessel to vessel, etc. This provides an opportunity for the liquid oxygen or liquid air to become contaminated with an additional quantity of oxidizable organic substances, thereby raising the contaminant level. In addition, particularly where the liquid oxygen or liquid air product is transported over long distances or stored for a considerable period of time awaiting use, a relatively large proportion of the product may be lost due to evaporation and result in the concentration of high boiling point contaminants in the remaining product. Thus, in the case of liquid oxygen, eventually a sufficiently high concentration of contaminants is present in a relatively small amount of liquid oxygen to produce an explosive mixture even though the contaminants originally were present in such low concentration as to be harmless. This is also true of liquid air, but to a lesser extent since liquid air contains a relatively large amount of nitrogen which serves as a diluent. However, when liquid air is subject to considerable loss by evaporation, the more volatile nitrogen tends to evaporate and concentrate the oxygen content along with the contaminating substances until eventually an explosive mixture may be formed.

Various uses of liquid oxygen also result in an explosion hazard. For example, one important method of obtaining gaseous oxygen in commercial quantities is by shipping liquid oxygen in an insulated vessel from a centrally located liquid oxygen plant to the site of use, and then evaporating the liquid oxygen as necessary in order to meet the gaseous oxygen requirement. The trace or small amounts of high boiling point oxidizable organic contaminants generally present in commercial liquid oxygen gradually become concentrated in the remaining liquid oxygen, and eventually the contaminants are sufficiently concentrated so as to result in the formation of an explosive mixture. The tendency of high boiling point contaminants to concentrate and form an explosive mixture is particularly hazardous in instances where additional liquid oxygen, together with its contaminant content, is added to the vessel from time to time in order to replace the liquid oxygen which is evaporated. This results in an increase in the total amount of contaminants present in the vessel. Eventually, a point is reached where an explosive mixture is formed, whether by continuing to add fresh liquid oxygen to the storage vessel and gradually concentrating an increasing quantity of contaminants in a relatively large volume of liquid oxygen, or by evaporating the contents of the vessel down to a point where substantially the entire quantity of high boiling point contaminants originally present in the liquid oxygen content is concentrated in only a very small volume of liquid oxygen. An explosive mixture thus formed is often very sensitive and has been found to be responsible for many serious explosions.

Still other uses of liquid oxygen and liquid air often result in an explosion hazard due to contamination with oxidizable organic substances. For example, liquid oxygen and liquid air are often used as coolants in laboratories where liquid nitrogen is not available. Such an application may be in the cooling of various types of laboratory apparatus. Considerable hazard is associated with this practice since organic substances may be present and form an explosive mixture with the liquid air or oxygen under certain conditions. Also, even in cases where liquid nitrogen is used as a coolant, the more volatile liquid nitrogen tends to condense oxygen from the atmosphere and, in some instances, organic contaminants. Upon continued evaporation of the more volatile liquid nitrogen, the resulting mixture becomes more concentrated in liquid oxygen and contaminants and eventually the composition may reach explosive proportions.

The tendency of liquid oxygen or other liquefied normally gaseous material containing free oxygen to form highly sensitive explosive mixtures with oxidizable organic contaminants is a long standing problem in the art.

Previous attempts to reduce the explosion hazard and solve the problem usually involved various means for reducing the concentration of contaminants or the use of large proportions of a diluent such as nitrogen, neither of which were satisfactory. For example, the prior art methods were not effective in preventing the build-up of an explosive concentration of contaminants during handling of either liquid oxygen or liquid air, as will be apparent from the foregoing discussion. In addition, heretofore a suitable desensitizer, as distinguished from a diluent, was not known for use in desensitizing liquid oxygen containing contaminants to thereby render the same harmless even though present in what normally would be an explosive concentration. As a result, the art has long sought a satisfactory method of reducing the sensitivity of liquefied normally gaseous materials containing free oxygen.

It is an object of the present invention to provide a novel composition of matter including a desensitizer and a normally gaseous material containing free oxygen.

It is a further object of the present invention to provide a novel composition of matter including a liquefied normally gaseous material containing free oxygen, an oxidizable organic substance which forms an explosive mixture with liquid oxygen, and a desensitizer.

It is still a further object of the present invention to provide a novel method of reducing the explosion hazard normally associated with handling a liquefied normally gaseous material containing free oxygen.

It is still a further object of the present invention to provide a novel method of reducing the explosion hazard when handling a composition including a liquefied normally gaseous material containing free oxygen and an oxidizable organic substance.

It is still a further object of the present invention to provide a novel method of reducing the explosion hazard when evaporating liquid oxygen to produce gaseous oxygen.

Still other objects and advantages of the present invention will be apparent to those skilled in the art by reference to the following detailed description and the example.

The present invention will be described and illustrated hereinafter with reference to liquid oxygen. However, it is understood that the principles of the invention are applicable to liquid air or other liquefied normally gaseous materials containing elemental or "free" oxygen, i.e., oxygen which is not combined with a second element.

The desensitizers useful in practicing the present invention are liquid oxygen soluble inert halogenated hydrocarbons containing at least one fluorine atom. Preferably, the halogenated hydrocarbons are saturated but, in instances where they are sufficiently inert, unsaturated halogenated hydrocarbons may be used.

The preferred halogenated hydrocarbons contain at least one fluorine atom and from one to five, inclusive, carbon atoms which may be in the form of a straight or branched chain. Specific examples of preferred inert halogenated hydrocarbons which have been found to be very satisfactory in practicing the present invention include $CHF_2Cl$, $CF_2Cl_2$, $CF_3Br$, $CF_3Cl$ and $C_3F_8$. Often, $CF_3Cl$ and $CF_3Br$ give the best results due to, in part, their greater solubility in liquid oxygen. The halogenated hydrocarbons may be used separately or as mixtures, and in some instances mixtures may be used to give physical characteristics which are more suitable for the type of protection desired in a specific application. The above halogenated hydrocarbons are often readily available in commercial quantities and suitable processes for their preparation are well known.

The preferred halogenated hydrocarbons possess a unique combination of physical and chemical properties which result in their peculiar suitability for the desensitization of liquid oxygen and other liquefied normally gaseous materials containing free oxygen. These unique physical and chemical properties include an extended liquid range, a very low vapor pressure at liquid oxygen temperature, solubility in liquid oxygen, and an ability to desensitize liquid oxygen as distinguished from acting as a mere diluent. More specifically, the halogenated hydrocarbons preferably have the following characteristics:

(1) Appreciable solubility in liquid oxygen or other liquefied gas to be desensitized in a range of at least a few mol percent;

(2) A boiling point relatively high compared with the boiling point of oxygen or other liquefied gas which is being desensitized;

(3) A vapor pressure in the vapor space above the solution of halogenated hydrocarbon and liquid oxygen or other liquefied gas not greater than about 1 micron; and (4) The halogenated hydrocarbon should be relatively inert, i.e., it should not be readily oxidizable or exhibit an appreciable tendency toward formation of an explosive mixture in the presence of liquid oxygen at liquid oxygen temperature and when operating in accordance with the present invention.

In several embodiments of the present invention, a most desirable property of the preferred halogenated hydrocarbons is a very low vapor pressure at liquid oxygen temperatures, such as of the order $10^{-5}$ and $10^{-4}$ mm. Hg. Thus, in instances where liquid oxygen is evaporated, the halogenated hydrocarbon remains behind in solution and there is virtually no contamination of the resulting gaseous oxygen with halogenated hydrocarbon. In addition, the halogenated hydrocarbon concentrates along with the oxidizable organic contaminants in precisely those areas where the contaminants concentrate, thereby allowing a relatively small amount of halogenated hydrocarbon to be added to a body of liquid oxygen containing trace amounts of impurities with assurance that an explosive concentration of organic contaminants will never be reached. Also, due to the relatively high boiling point and low volatility of the halogenated hydrocarbons, they may be recovered for use in desensitizing additional liquid oxygen.

Liquid oxygen may be either completely desensitized or only partially desensitized, depending upon the amount of inert halogenated hydrocarbon added and the amount and/or nature of the specific oxidizable organic substances which are present. In view of this, it is not practical to set definite upper and lower limits for the amount of halogenated hydrocarbon to be dissolved in liquid oxygen other than to state that it should be dissolved in quantities effective to produce the desired degree of protection at a given concentration of a specific oxidizable organic substance. In general, however, the halogenated hydrocarbon should be present in an amount of about 0.5–50 mol percent. In the specification and claims, the mol percent of halogenated hydrocarbon is based upon the total molar quantity of liquid oxygen and halogenated hydrocarbon present unless otherwise indicated. Thus, a mixture containing one mole of oxygen, one mol of halogenated hydrocarbon, and a quantity of organic contaminants would be considered as containing 50 mol percent of halogenated hydrocarbon for the purpose of the present invention.

The halogenated hydrocarbon need be dissolved in liquid oxygen in only small quantities for complete protection against the more insoluble and most dangerous contaminants, such as acetylene and lubricating oil. Generally, a quantity of the halogenated hydrocarbon as small as 20 mol percent will give complete protection when liquid oxygen is saturated with these contaminants. Where smaller amounts of acetylene and lubricating oil are present, or where it is not necessary to provide complete protection, then smaller amounts may be used. Other hydrocarbon contaminants, such as methane, ethane and ethylene, present a less serious explosion hazard than does acetylene and lubricating oil. These substances are more soluble in liquid oxygen, as well as more volatile, and a much higher concentration must be present before an explosive concentration is reached. For example, methane must be present in liquid oxygen to the extent of at least about 10 mol percent before an explosion can occur, while only extremely small quantities such as a few parts per million of acetylene and lubricating oil will result in the formation of solid particles which are very sensitive to explosive initiation.

This is of importance since liquid oxygen containing 33 mol percent methane, i.e., a stoichiometric solution of methane in liquid oxygen, requires about 50 mol percent of halogenated hydrocarbon to completely suppress an explosion. However, with smaller amounts of methane, such as about 18 mol percent, about 20 mol percent of halogenated hydrocarbon will completely suppress an explosion. Thus, about 10–25 mol percent of halogenated hydrocarbon, preferably about 20 mol percent, generally offers excellent protection in instances where liquid oxygen contains the more insoluble type of contaminants such as acetylene and/or quantities usually encountered in practice of the more volatile contaminants such as methane. In instances where only trace or very small amounts of oxidizable organic contaminants are present, such as a commercial liquid oxygen product as it is obtained from a liquid oxygen plant, then only very small amounts of halogenated hydrocarbon need be added in most instances. For example, an amount as small as about 0.5 to 5 mol percent, preferably 1 to 2 mol percent, generally is effective in reducing the explosion hazard during subsequent handling of commercial liquid oxygen.

The solutions of halogenated hydrocarbon in liquid oxygen described herein may be prepared in any suitable manner, such as by adding a desired amount of halogenated hydrocarbon in the liquid state to liquid oxygen, and then mixing the two substances. However, other methods of preparation may be used. For example, a gaseous mixture including halogenated hydrocarbon and oxygen in desired proportions may be prepared and then liquefied, or gaseous halogenated hydrocarbon may be bubbled into liquid oxygen.

The term "handling" as used in the specification and claims is intended to include various operations that liquid oxygen is subjected to after preparation, such as transfer from vessel to vessel, storage, transportation, evaporation, etc. Also, in the specification and claims, where it is stated that the explosion hazard is reduced by dissolving an inert halogenated hydrocarbon having at least one fluorine atom in the liquefied normally gaseous material containing free oxygen, such terminology or similar terminology is intended to include dissolving halogenated hydrocarbon directly into the liquefied normally gaseous material, as well as first dissolving the halogenated hydrocarbon in a suitable solvent and then adding the resulting halogenated hydrocarbon-containing solution to the liquefied normally gaseous material to be desensitized. A composition of matter in accordance with the present invention including a halogenated hydrocarbon dissolved in liquid oxygen is particularly desirable as the explosion hazard normally associated with the handling of liquid oxygen is reduced or eliminated. This is true even though the liquid oxygen may not contain contaminants in sufficient high concentration to cause an immediate explosion hazard since additional contaminants may be collected during handling, or those originally present may become sufficiently concentrated to produce an explosive mixture. The present invention is of importance whenever oxidizable organic substances are present in liquid oxygen, and whether such substances are present as contaminants or purposely added. For example, the invention also is useful in reducing the explosion hazard normally associated with handling explosive mixtures of liquid oxygen and an oxidizable organic component, such as liquid oxygen-charcoal mixtures, solutions of methane in liquid oxygen, etc.

Still another important use of the present invention is in a method of producing gaseous oxygen by evaporation of liquid oxygen. This embodiment of the invention is particularly advantageous where the liquid oxygen to be evaporated contains trace or small amounts of high boiling point oxidizable organic substances which tend to concentrate and produce an explosive mixture during the evaporation process. In such instances, usually a relatively small amount of halogenated hydrocarbon need be present, such as about 0.5 to 5 mol percent of the original amount of liquid oxygen. The halogenated hydrocarbon concentrates in the remaining liquid oxygen along with the oxidizable organic substances as the liquid oxygen is evaporated and thus offers greater protection as the need for protection increases.

One important feature of the present invention is that inert halogenated hydrocarbon containing organic contaminants may be withdrawn periodically as necessary depending upon the rate of increase in the contaminant level, the contaminant content removed therefrom by some suitable conventional method of purification such as filtration, adsorption, or distillation, and then the purified halogenated hydrocarbon may be reused to desensitize additional liquefied gas. For example, when relatively insoluble substances such as acetylene and lubricating oils are the contaminating substances, the major proportion of the contaminants may be removed by filtration, while more soluble contaminants such as methane, ethane, etc. may be removed by distillation. A combination of filtration, distillation, or other conventional purification processes may be used, if desired. It is also possible to withdraw a portion of the contaminated but desensitized contents of a storage vessel, purify the withdrawn portion to lower the contaminant level by any suitable method such as those above mentioned, and then pass the purified portion back to the storage vessel. Whatever the method of purification, the desensitizer may be used numerous times in the desensitization of liquid gases and thus the process of the present invention is very economical.

The addition of a halogenated hydrocarbon to liquid oxygen is not the equivalent of adding a diluent such as nitrogen or argon which, because of its inertness, would render the oxygen less reactive or act to take up energy and prevent an explosion from propagating. Rather, the effect of the halogenated hydrocarbon appears to be specific to a reaction between liquid oxygen and the oxidizable organic component. For example, the halogenated hydrocarbons do not appear to act as diluents that merely take up heat since experimental data indicate that the heat capacity of a given halogenated hydrocarbon bears little or no relationship to the effectiveness of the compound as an inhibitor or desensitizer of explosion. Thus, halogenated hydrocarbons having heat capacity values covering a wide range are all substantially equally effective at a given mol percent concentration. While we do not intend to be bound by any explanation or theory, one plausible explanation for this unusual and unexpected result is that the halogenated hydrocarbon may actually enter into what may be considered to be a reaction with the liquid oxygen and contaminant under conditions which would ordinarily result in an explosion and behaves as a deterrent in the chain reactions. Qualitative experimental evidence indicates that halogenated hydrocarbons act as chain stopper in such chain reactions since if a powerful ignition system is applied to liquid oxygen containing contaminants and about 15 mol percent of halogenated hydrocarbon, then very localized reactions or explosions will take place but they are almost immediately halted.

The foregoing detailed description and the following specific example are for the purpose of illustration only, and are not intended as limiting to the spirit or scope of the appended claims.

*Example I*

Mixtures containing desired mol percentages of an inert halogenated hydrocarbon, liquid oxygen, and a contaminant (such as acetylene) were prepared. The mixtures were then placed in tubes and maintained in the liquid state awaiting testing. Each tube was provided with a spark gap in a lower portion of the tube which was arranged so as to be covered by a pool of the mixture. Ignition (or attempted ignition) of each mixture was accomplished by passing a spark across the spark gap. A number of different compositions for each contaminant at a given contaminant level were ignited in order to determine the minimum mol percent of halogenated hydrocarbon necessary to suppress an explosion (based on the number of mols of oxygen and halogenated hydrocarbon present). For the purpose of comparing insert diluents with the halogenated hydrocarbon desensitizers of the present invention, runs were made identical with those above described with the exception of substituting nitrogen or argon for the halogenated hydrocarbon. The mol percent of halogenated hydrocarbon, nitrogen or argon (based on the number of mols of oxygen and halogenated hydrocarbon, nitrogen or argon present) required to just suppress an explosion in each different composition was determined and recorded. The data thus obtained are tabulated below:

| Hydrocarbon Contaminant | Halogenated Hydrocarbon | Nitrogen | Argon |
|---|---|---|---|
| Motor Oil (Saturated) | 20 | 60 | 70 |
| Acetylene (Saturated) | 20 | 90 | 70 |
| Ethylene (Saturated at 5 p.s.i.g) | 40 | >90 | >90 |
| Methane (Stoichiometric—33 mol-percent) | 50 | 75 | 75 |
| Methane (18 mol-percent) | 15 | | |

It is apparent from the above tabulated data that only 20 mol percent of the halogenated hydrocarbon was required to completely suppress an explosion when the liquid oxygen. In contrast to this, it required 60 to 90 acetylene, these two substances being the two most objectionable contaminants normally found in commercial liquid oxygen. In contrast to this, it required 60 to 90 mol percent of nitrogen, or 70 mol percent of argon, to dilute liquid oxygen saturated with motor oil and acetylene to a point where it was no longer explosive.

Very small quantities of halogenated hydrocarbon did not necessarily dampen the explosive reaction. However, it was found that when the quantity of halogenated hydrocarbon present approached the minimum mol percent necessary to completely suppress an explosion, then the resulting explosion was considerably milder than in mixtures where no halogenated hydrocarbon, or only a small amount of halogenated hydrocarbon, was present. Thus, it is possible to partially desensitize a mixture containing liquid oxygen and an oxidizable organic substance which forms an explosive mixture with liquid oxygen, thereby decreasing the sensitivity of the mixture and/or decreasing the violence of an explosion should an explosion occur.

The specific inert halogenated hydrocarbons used in this example were $CHF_2Cl$, $CF_2Cl_2$, $CF_3Cl$, $CF_3Br$ and $C_3F_8$. Each of these inert halogenated hydrocarbons was found to be very effective in desensitizing liquid oxygen containing an oxidizable organic material. In addition, it was found that each of these halogenated hydrocarbons is substantially equally effective, on a mol percent basis, in suppressing explosions.

The spark gap described above for initiating an explosion was replaced by a fusible wire as an ignition source. Ignition or attempted ignition also was accomplished by a number of other methods such as by introducing an ozone-oxygen mixture into the tube. All of these methods have been found to be ineffective in initiating an explosion provided the proper amount of halogenated hydrocarbon is present, such as tabulated in the above table. Thus, mixtures containing liquid ozone-oxygen and an oxidizable organic substance may be desensitized in accordance with the present invention.

What is claimed is:

1. A liquid composition of matter comprising liquid free oxygen and a halogenated lower aliphatic hydrocarbon inert with respect to liquid free oxygen when dissolved therein, the halogenated hydrocarbon being soluble in liquid free oxygen and present in solution in the liquid composition in an amount effective to reduce the explosion hazard, the halogenated hydrocarbon containing at least one fluorine atom and being present in an amount of about 0.5–50 mol percent.

2. A liquid composition of matter comprising liquid free oxygen, an oxidizable organic substance which normally forms an explosive mixture with liquid free oxygen, and a halogenated lower aliphatic hydrocarbon of the general formula $C_nX_mH_{2n+2-m}$ inert with respect to liquid free oxygen when dissolved therein, where X is halogen and at least one X is fluorine and $n$ and $m$ are whole numbers, the halogenated hydrocarbon being soluble in liquid free oxygen and present in an amount effective to reduce the explosion hazard, the halogenated hydrocarbon being present in solution in the liquid composition in an amount of about 0.5–50 mol percent.

3. The composition of claim 2 wherein $n$ is less than 4 and the halogenated hydrocarbon is present in an amount of about 0.5–25 mol percent.

4. The composition of claim 2 wherein $n$ is 1 and $m$ is equal to $2n+2$.

5. The composition of claim 2 wherein the halogenated hydrocarbon is selected from the group consisting of $CHF_2Cl$, $CF_2Cl_2$, $CF_3Br$, $CF_3Cl$, $C_3F_8$ and the halogenated hydrocarbon is present in an amount of about 0.5–25 mol percent.

6. In a method of storing a liquid composition comprising liquid free oxygen wherein the liquid composition is subject to explosion in the presence of an oxidizable organic substance which normally forms an explosive mixture with liquid free oxygen, the improvement comprising reducing the explosion hazard by dissolving a soluble halogenated lower aliphatic hydrocarbon having at least one fluorine atom in the liquid composition, the halogenated hydrocarbon being inert with respect to liquid free oxygen when dissolved therein and present in an amount effective to reduce the explosion hazard, the halogenated hydrocarbon being present in solution in the liquid composition in an amount of about 0.5–50 mol percent.

7. The method of claim 6 wherein the halogenated hydrocarbon contains not more than 5 carbon atoms.

8. The method of claim 6 wherein the halogenated hydrocarbon is selected from the group consisting of $CHF_2Cl$, $CF_2Cl_2$, $CF_3Br$, $CF_3Cl$ and $C_3F_8$ and the halogenated hydrocarbon is present in the liquid composition in an amount of about 0.5–25 mol percent.

9. In a method wherein liquid oxygen containing an oxidizable organic substance which normally forms an explosive mixture with liquid oxygen is evaporated to produce gaseous oxygen, the oxidizable substance being less volatile than the liquid oxygen, the improvement comprising evaporating the liquid oxygen in the presence of a dissolved soluble halogenated lower aliphatic hydrocarbon of the general formula $C_nX_mH_{2n+2-m}$ where X is halogen and at least one X is fluorine and $n$ and $m$ are whole numbers, the halogenated hydrocarbon being inert with respect to liquid oxygen when dissolved therein and present in an amount effective to reduce the explosion hazard, the halogenated hydrocarbon being present in solution in the liquid oxygen in an amount of about 0.5–50 mol percent.

10. The method of claim 9 wherein $n$ is less than four and the halogenated hydrocarbon is present in solution in an amount of about 0.5–25 mol percent.

11. The method of claim 9 wherein $n$ is 1 and $m$ is equal to $2n+2$.

12. The method of claim 9 wherein the halogenated hydrocarbon is selected from the group consisting of $CHF_2Cl$, $CF_2Cl_2$, $CF_3Br$, $CF_3Cl$ and $C_3F_8$ and the halogenated hydrocarbon is present in solution in an amount of about 0.5–25 mol percent.

References Cited in the file of this patent

UNITED STATES PATENTS

| | | |
|---|---|---|
| 2,490,986 | Symonds | Dec. 13, 1949 |
| 2,650,478 | Brown | Sept. 1, 1953 |
| 2,713,775 | Cottle | July 26, 1955 |
| 2,874,164 | Hann | Feb. 17, 1959 |
| 2,876,077 | Haller | Mar. 3, 1959 |

FOREIGN PATENTS

| | | |
|---|---|---|
| 729,010 | Great Britain | Apr. 27, 1955 |

UNITED STATES PATENT OFFICE
CERTIFICATE OF CORRECTION

Patent No. 3,081,157

March 12, 1963

William E. Gordon et al.

It is hereby certified that error appears in the above numbered patent requiring correction and that the said Letters Patent should read as corrected below.

Column 5, line 62, for "sufficient" read -- sufficiently --; column 6, line 63, for "stopper" read -- stoppers --; column 7, line 15, for "insert" read -- inert --; line 24, for "tubulated" read -- tabulated --; line 42, strike out ". In contrast to this, it required 60 to 90", and insert instead -- was saturated with either motor oil or --.

Signed and sealed this 8th day of October 1963.

(SEAL)
Attest:

ERNEST W. SWIDER
Attesting Officer

EDWIN L. REYNOLDS
Acting Commissioner of Patents